US008695107B2

(12) United States Patent
Ishida

(10) Patent No.: US 8,695,107 B2
(45) Date of Patent: Apr. 8, 2014

(54) INFORMATION PROCESSING DEVICE, A HARDWARE SETTING METHOD FOR AN INFORMATION PROCESSING DEVICE AND A COMPUTER READABLE STORAGE MEDIUM STORED ITS PROGRAM

(75) Inventor: Kensuke Ishida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 277 days.

(21) Appl. No.: 13/007,766

(22) Filed: Jan. 17, 2011

(65) Prior Publication Data

US 2011/0179493 A1    Jul. 21, 2011

(30) Foreign Application Priority Data

Jan. 20, 2010    (JP) ................................. 2010-009596

(51) Int. Cl.
*G06F 1/26*    (2006.01)
*G06F 21/86*    (2013.01)
*G06F 11/20*    (2006.01)

(52) U.S. Cl.
CPC ............ *G06F 21/86* (2013.01); *G06F 11/2028* (2013.01); *G06F 11/2038* (2013.01); *G06F 11/2043* (2013.01)
USPC ......................................................... 726/34

(58) Field of Classification Search
CPC ......... G06F 21/86; G06F 21/88; G06F 21/73; G06F 11/2028; G06F 11/2038; G06F 11/2043
USPC .................................................... 726/25, 35
See application file for complete search history.

(56) References Cited

U.S. PATENT DOCUMENTS

| | | | |
|---|---|---|---|
| 5,345,590 A * | 9/1994 | Ault et al. .......................... 718/1 |
| 2003/0159056 A1* | 8/2003 | Cromer et al. ................ 713/193 |
| 2005/0246521 A1* | 11/2005 | Bade et al. ..................... 713/150 |
| 2006/0149906 A1* | 7/2006 | Misra ............................ 711/152 |
| 2007/0016801 A1 | 1/2007 | Bade et al. |
| 2008/0244261 A1 | 10/2008 | Wiseman et al. |
| 2008/0276222 A1 | 11/2008 | Yamagami |

FOREIGN PATENT DOCUMENTS

| | | |
|---|---|---|
| EP | 0472861 A2 | 3/1992 |
| EP | 1975834 A2 | 10/2008 |
| EP | 1980943 A1 | 10/2008 |
| JP | 2007-026442 A | 2/2007 |

OTHER PUBLICATIONS

Extended European Search Report mailed Jun. 6, 2011 for corresponding European Application No. 11151380.0.

* cited by examiner

*Primary Examiner* — Samson Lemma
(74) *Attorney, Agent, or Firm* — Fujitsu Patent Center

(57) ABSTRACT

An information processing device includes a replacement function of a system unit in a partition and a TPM (trusted platform module) function in the system unit. The system unit sets the TPM to valid or invalid and a management unit sets a reserved system board in the partition. The TPM setting information of the system unit and the reserved setting information of the system unit by the management unit are notified each other and are exclusive controlled. It is effectively possible to execute a reserved SB function, which integrates the reserved system board and re-starts without manual operation even though using a system unit which mounts the trusted platform module.

18 Claims, 15 Drawing Sheets

FIG. 10

| PROCESS | MMB | BMC | BIOS |
|---|---|---|---|
| 1 | Set Reserved SB<br>Set Reserved SB to the partition.<br>(Assert RSVD_SB_EN#) | | |
| 2 | Start Partition | | Start BIOS |
| 3 | | | In case of not entering BIOS Setup Menu<br>Read the value (TPM Invalid) stored in EFI Backup ROM and set it to TPM(※1)<br>In case of entering BIOS Setup Menu to enable the TPM chip<br>Issue an alarm and inhibit to change to valid of TPM function even though performing the change, because of checking that RSVD_SB_EN# signal is asserted |

FIG.11

| PROCESS | MMB | BMC | BIOS |
|---|---|---|---|
| 1 | Start Partition<br>RSVD_SV_EN# is de-asserted because Reserved SB is not set | | Start BIOS |
| 2 | | | In case of not entering BIOS Setup Menu<br>Read the value (TPM valid) stored in EFI Backup ROM and assert TPM_ENABLE to make the TPM to be valid(※1)<br>BIOS sends TPM state to BMC after setting the valid<br>In case of entering BIOS Setup Menu to enable the TPM chip<br>It is possible to set TPM valid because RSVD_SB_EN# is de-asserted by checking GPIO by BIOS.<br>BIOS sends TPM state to BMC and store the setting to Backup ROM. |
| 3 | | Store TPM State (valid or invalid state of TPM) sent from BIOS | |
| 4 | MMB obtains the TPM State from BMC.<br>MMB recognizes that BIOS has set TPM valid to the partition. | | |
| 5 | MMB control to inhibit to set the Reserved SB to the partition when setting the Reserved SB. | | |

FIG.14

| PROCESS | MMB | BMC | BIOS |
|---|---|---|---|
| 1 | Set Reserved SB | | |
| 2 | Notify the setting status of Reserved SB to BMC by command A | Hold the setting status of Reserved SB which is notified from MMB | |
| 3 | Start Partition | | Start BIOS. In case of not entering BIOS Setup Menu Read the value (TPM Invalid) stored in EFI Backup ROM and set it to TPM In case of entering BIOS Setup Menu to enable the TPM Chip |
| 4 | | | Obtain the setting status of Reserved SB from BMC by issuing command B. When the setting of Reserved SB is existed, BIOS issues an alarm and inhibits that function of TPM makes valid. |

FIG. 15

| PROCESS | MMB | BMC | BIOS |
|---|---|---|---|
| 1 | Start Partition. Notify status that the Reserved SB is not set by command A or not issues command A because the Reserved SB is not set | | |
| 2 | | Store the set status of Reserved SB which is notified from MMB. Default is not when it not notified that the Reserved SB is not set. | |
| 3 | | | Start BIOS. In case of not entering BIOS Setup Menu Read the value (TPM valid) stored in EFI Backup ROM and assert TPM_ENABLE to make the TPM to be valid.(※1) BIOS sends TPM state to BMC after setting the valid the TPM Chip. In case of entering BIOS Setup Menu to enable the TPM Chip. Obtain set status of Reserved SB by issuing command B to BMC. It is possible to set TPM valid because Reserved SB is not set. After setting valid, BIOS sends TPM State to BMC and stores set state to Backup ROM. |
| 4 | | Store TPM State (valid or invalid state of TPM) sent from BIOS | |
| 5 | MMB obtains the TPM State from BMC. MMB recognizes that BIOS set TPM valid to the partition. | | |
| 6 | MMB control to inhibit to set the Reserved SB to the partition when setting the Reserved SB. | | |

INFORMATION PROCESSING DEVICE, A HARDWARE SETTING METHOD FOR AN INFORMATION PROCESSING DEVICE AND A COMPUTER READABLE STORAGE MEDIUM STORED ITS PROGRAM

CROSS-REFERENCE TO RELATED APPLICATION

This application is based upon and claims the benefit of priority of the prior Japanese Patent Application No. 2010-009596, filed on Jan. 20, 2010, the entire contents of which are incorporated herein by reference.

FIELD

The embodiments discussed herein are related to an information processing device, a hardware setting method for an information processing device, and a computer readable medium stored its program.

BACKGROUND

An information processing system, for example a server system, has a hardware resource such as a system board as a processing device which includes a CPU (Central Processing Unit) as an arithmetic processing unit and a memory as a main storage. The system is operated by physically or logically dividing the hardware resource into a plurality of partition. In each partition, an OS (Operating System) can operate independently and an application job (program) can be executed via the operation of the OS. That is, the server system has a plurality of partition on which the OS can operate and execute a plurality of different or same OSes.

The server, which can partition, has a structure that the system board, which is mounted the CPU and the memory, and an IOU (Input Output Unit), which is mounted an IO (Input Output) device such as a LAN (Local Area Network) unit, are connected by a crossbar switch or a switch as a data transmission unit. It is possible to logically divide into a plurality of system by appropriately setting the crossbar switch or the switch.

By such structure of the server, it is possible to arbitrary allocate the system board resource and the IOU resource according to a scale of the system in operation. That is, it is easy to allocate partition functions within an arbitrary range and an arbitrary number.

In the server, which can partition, it is effective to provide a reserved function of the system board (a Reserved SB function). The Reserved SB function is to reserve the other system board in advance against a failure of one system board which is operating. By this Reserved SB function, when one system board of which operation is failed, it is possible to automatically incorporate the reserved system board to relieve a failure system board without a manually operation such as a CE (Customer Engineer).

While, it is possible to provide a security function to the system board by mount of a trusted platform module (called as TPM) as a security device on the system board. The trusted platform module is a security chip which has an encryption processing function, store function of an encrypt key and a construction certify function of a platform. This TPM can be used to detect a falsification by encrypting the data (storage data), authentication of the device and a construction certify of the platform.

Patent Document 1: Japanese Laid-open Patent Publication No. 2007-026442

SUMMARY

Because only one the TPM can be valid for one system board, a user manually or automatically sets the system board which uses the TPM when setting the partition. The system board which is set the TPM is called as a home system board (Home SB).

While, when combining the reserved SB function with the TPM, if the home system board is failed, the reserved system board is allocated. A TPM chip (Trusted Platform Module chip) itself which mounts the security function also is made to change by the allocation of the system board.

Because the TPM creates a different encryption for each TPM chip, an error is occurred due to an automatic construction certify function which runs when the system is re-started for each change of the system board. Therefore, the system board after changed has not started. It is difficult to realize the reserved SB function which automatically incorporates the reserved system board and re-starts the system without a manually operation such as a CE (Customer Engineer), in case of mounting the TPM on the system board.

According to an aspect of the invention, an information processing device includes a plurality of processing device which has a hardware resource including an arithmetic processing unit and a memory, a security unit which secures a security of the hardware resource, a setting data holding unit which holds a setting information of the hardware, a notification unit which notifies the setting information and an exclusive control unit which exclusive controls a set for make a valid of the security unit; and a system control device which sets same partition to at least two the processing device among the plurality of processing device and reserves the other processing unit so as to operate instead of one processing unit which has occurred a failure in the same partition.

According to the other aspect of the invention, a hardware setting method in an information processing device that includes a plurality of processing device which has a hardware resource including an arithmetic processing unit and a memory, a security unit which secures a security of the hardware resource, a setting data holding unit which holds a setting information of the hardware, a notification unit which notifies the setting information and an exclusive control unit which exclusive controls a set for make a valid of the security unit, includes a step that a system control device in the information processing device sets same partition to at least two the processing device among the plurality of processing device, and a step that the system control device reserves the other processing unit so as to operate instead of one processing unit which has occurred a failure in the same partition.

Further, according to the other aspect of the invention, a computer readable medium stored a hardware setting program of an information processing device that includes a plurality of processing device which has a hardware resource including an arithmetic processing unit and a memory, a security unit which secures a security of the hardware resource, a setting data holding unit which holds a setting information of the hardware, a notification unit which notifies the setting information and an exclusive control unit which exclusive controls a set for make a valid of the security unit, the program causes a system control device in the information processing device to execute, setting same partition to at least two the processing device among the plurality of processing device, and reserving the other processing unit so as to operate instead of one processing unit which has occurred a failure in the same partition.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is an explanatory diagram of the exclusive processing when the MMB sets that the reserved SB is set in advance in a first embodiment;

FIG. 11 is an explanatory diagram of the exclusive processing when the BIOS sets that the TPM is valid in advance in the first embodiment;

FIG. 14 is an explanatory diagram of the exclusive processing when the MMB sets that the reserved SB is set in advance in the second embodiment;

FIG. 15 is an explanatory diagram of the exclusive processing when the BIOS sets that the TPM is valid in advance in the second embodiment.

DESCRIPTION OF EMBODIMENTS

The embodiments will be explained below in the following order; an information processing device, a hardware setting method, a first embodiment of the hardware setting processing, a second embodiment of the hardware setting processing, and the other embodiments, but the disclosed information processing device are not limited to these embodiments. The information processing device will be explained as a server system in below examples.

(Information Processing Device)

Figure 1:
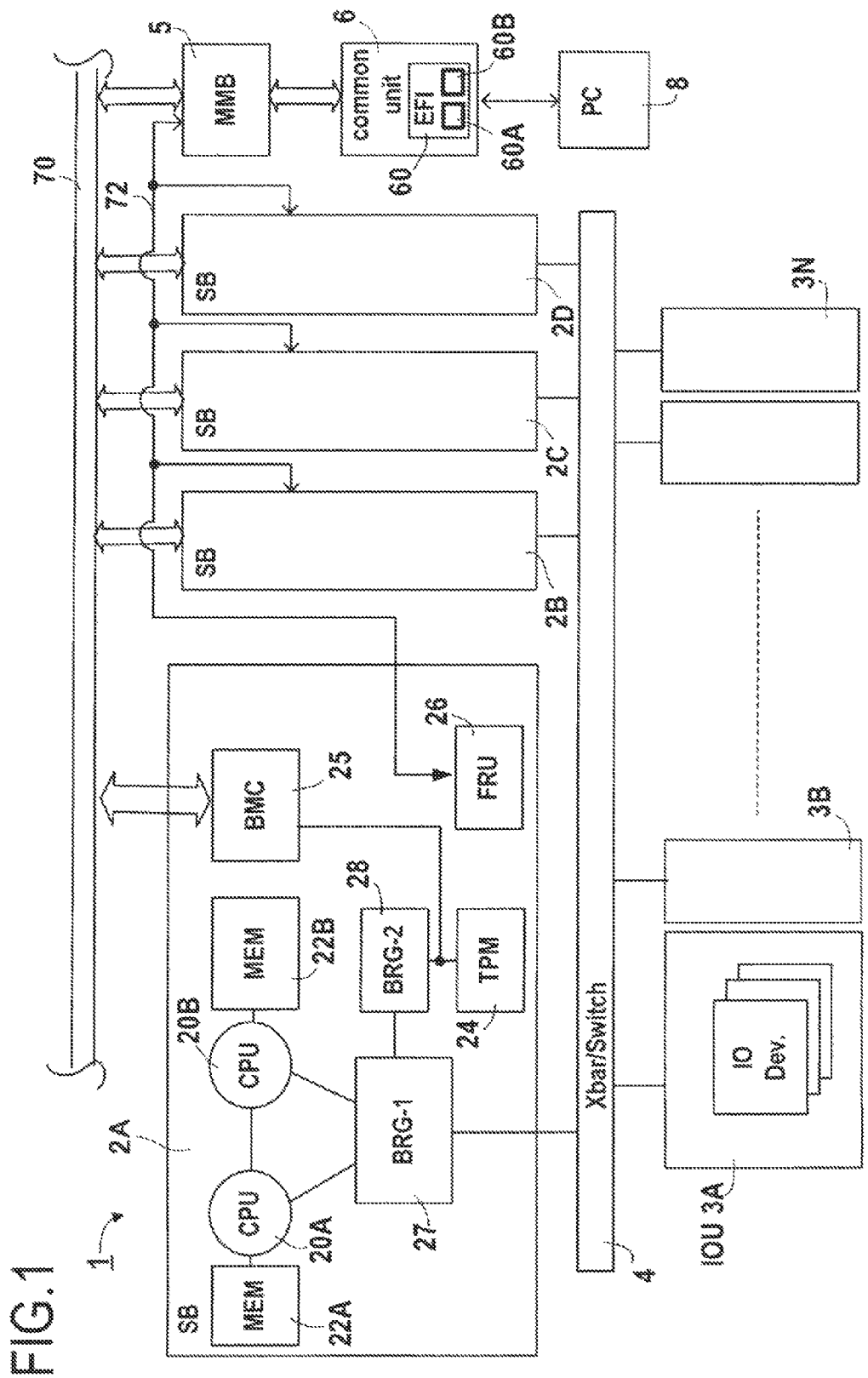
FIG. 1 is a configuration diagram of an information processing device according to an embodiment of the invention.

FIG. 1 illustrates a configuration diagram of an information processing device according to an embodiment. The information processing device in FIG. 1 illustrates the server system. The server system 1 includes a plurality of system board (called as SB) 2A to 2D as a processing device, a management board (called as MMB) 5 as a system control device (or SVP: Service Processor), a crossbar switch (or a switch) 4, a plurality of Input Output Unit (called as IOU) 3A, 3B, to 3N, a common unit board 6, an internal interface 70 and an internal bus 72 such as I2C (Inter Integrated Circuit).

Each system board 3A to 3D includes CPUs (Central Processing Unit) 20A and 20B as a pair of an arithmetic processing unit, memories 22A and 22B as a pair of main storage unit, a trusted platform module (called as TPM) 24 as a security unit, a baseboard management controller (called as BMC) 25, a field replacement unit (called as FRU) 26, a first bridge circuit 27 and a second bridge circuit 28.

BMCs 25 in each system board 2A to 2D are connected to the management board 5 via the internal interface such as LAN (Local Area network). The management board 5 monitors status of each system board 2A to 2D, and starts and stop controls the system board 2A to 2D. Each system board 2A to 2D connect to the IOU 3A to 3N via the crossbar switch (or the switch) 4.

The IOU 3A to 3N mount an IO device such as a LAN device and a storage controller. It is possible to logically divide into a plurality of system by appropriately setting the crossbar switch (or the switch) 4 and to arbitrary allocate the system board resource and the IOU resource according to a scale of the system in operation.

In each system board 2A to 2D, each of pair of CPUs 20A, 20B connects to memories 22A, 22B and connects to the first bridge circuit 27. The CPUs 20A, 20B execute a desired application program based on the operation of the OS to perform a processing of a job. And the CPUs 20A, 20B communicates commands and data with the IOU 3A to 3N via the crossbar switch (or the switch) 4 thorough the first bridge circuit 27.

The first bridge circuit 27 connects to the second bridge circuit 28 and the crossbar switch (or the switch) 4. That is, The first bridge circuit 27 performs a bridge function which connect CPUs 20A, 20B to the second bridge circuit 28 and the crossbar switch (or the switch) 4. The second bridge circuit 28 connects to the TPM 24 and the BMC 25. The BMC 25 executes a processing of setting and managing in the system board 2A in cooperation with the MMB 5.

The FRU 26 includes a storage unit which stores system information such as construction information in the system board in advance, and stores information whether or not the TPM is mounted on the system board as one part of the construction information. The MMB 5 connects the FRU 26 via the internal bus 72 such as I2C (Inter Integrated Circuit) and directly reads the storage information in the FRU 26. An EFI (Extensible Firmware Interface) backup EEPROM (Electric Erasable Program Read Only Memory) 60 is provided to the common unit 6 which mounts a power supply unit and a fan unit.

The EFI backup EEPROM 60 is preferably composed of a non-voluntary EEPROM and stores information that is set by a BIOS (Basic Input Output System) as a firmware which operates on the system board. The EFI backup EEPROM 60 has a TPM setting memory area 60A and a reserved SB (System Board) setting memory area 60B. And an external device 8 is preferably composed of a personal computer (called as PC). The external device 8 connects to the common unit 6 and the MMB 5 and instructs a various setting by selecting items on a screen.

In this embodiment, an example that all the system boards 2A to 2D are mounted the TPM 24 is explained, but it is applied to exist the system board which is not mounted the TPM 24 in the system. The server system independently executes information processing via the OS in each partition, and can arbitrary select combinations the system board and the IOU which is composed of a partition.

(Hardware Setting Method)

Figure 2:
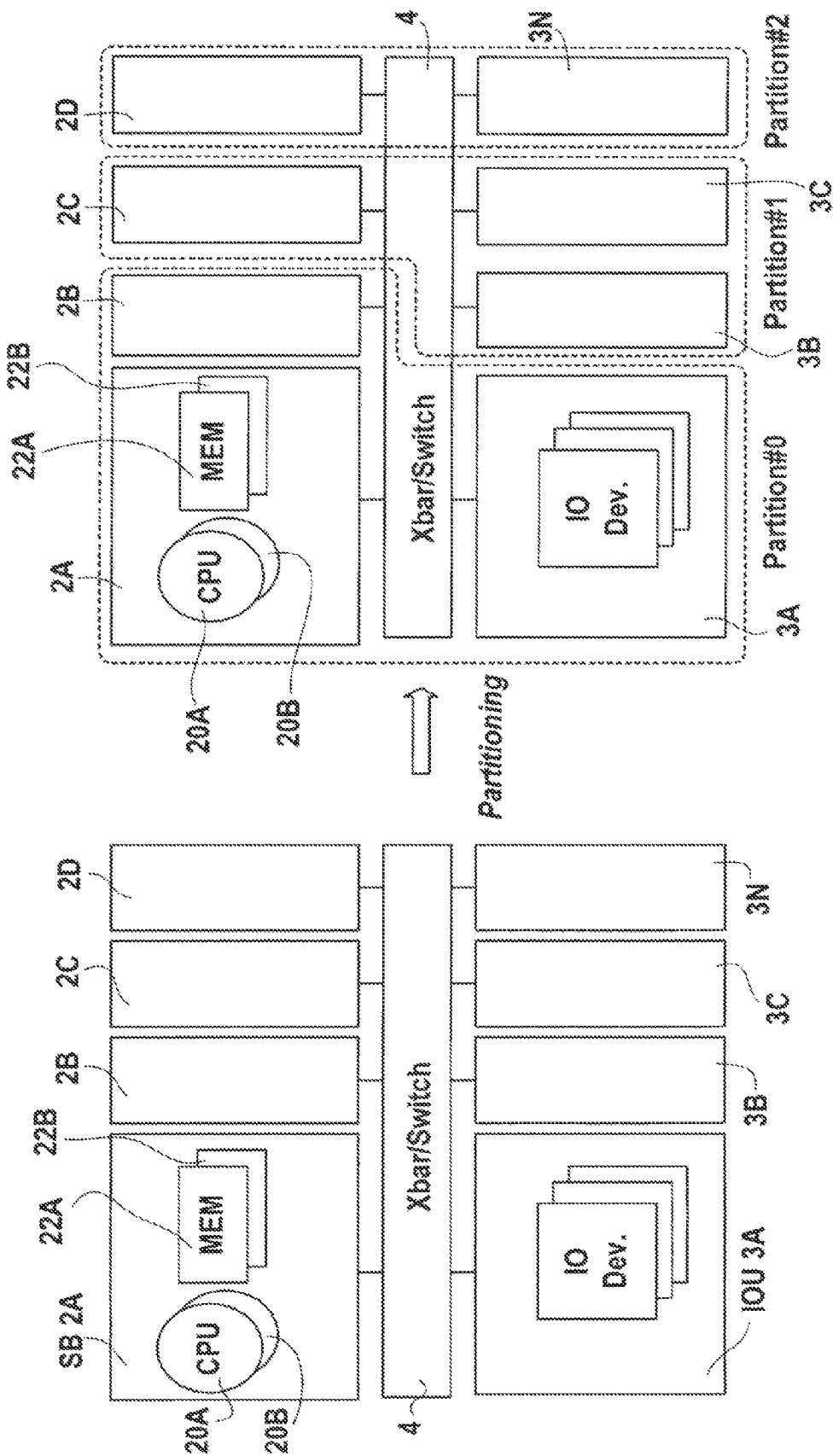
FIG. 2 is an explanatory diagram of a configuration embodiment of partitions in the information processing device depicted in FIG. 1.
Figure 3:
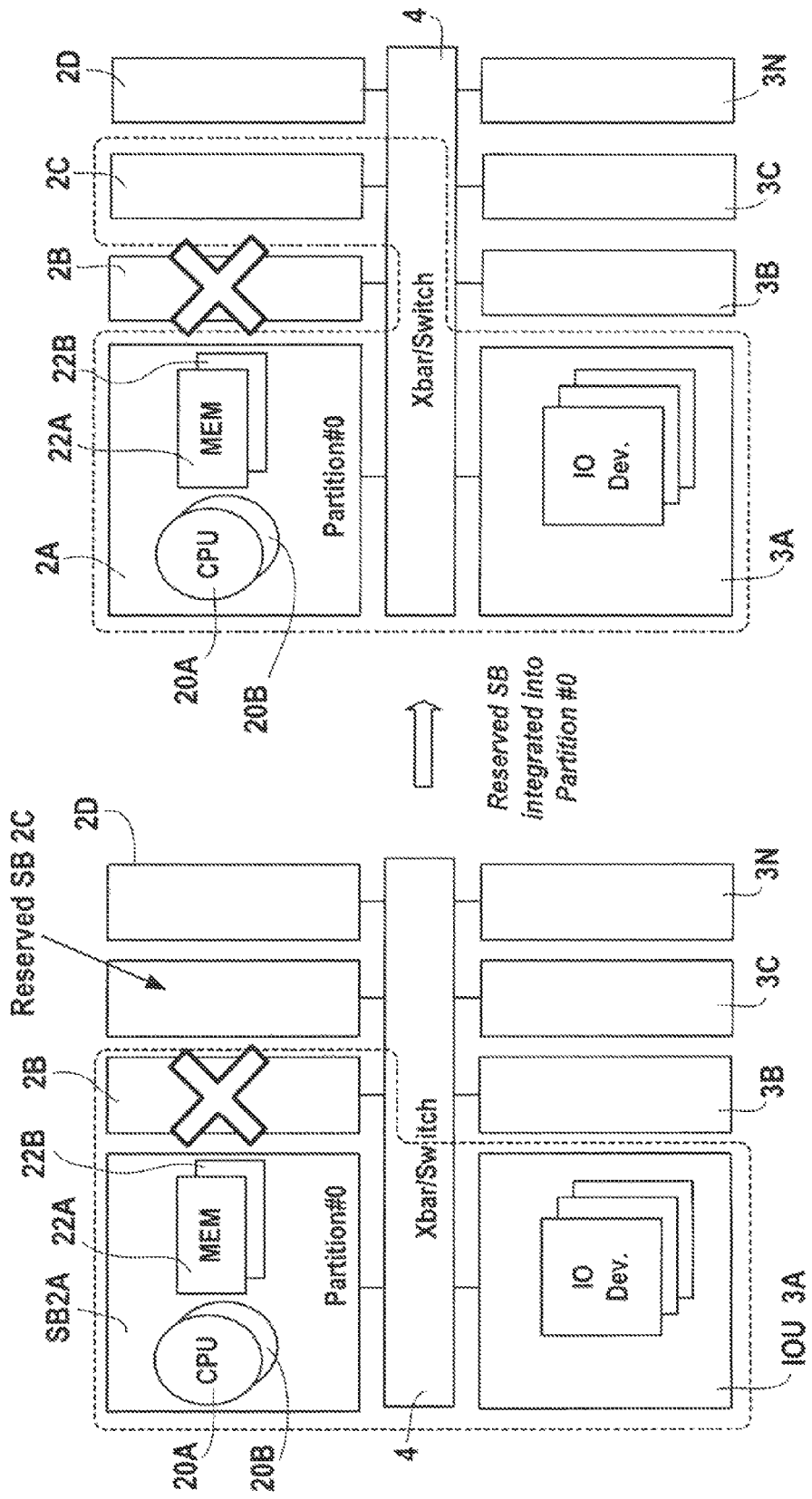
FIG. 3 is an explanatory diagram of an operation of a reserved replacement in the embodiment depicted in FIG. 2.
Figure 4:
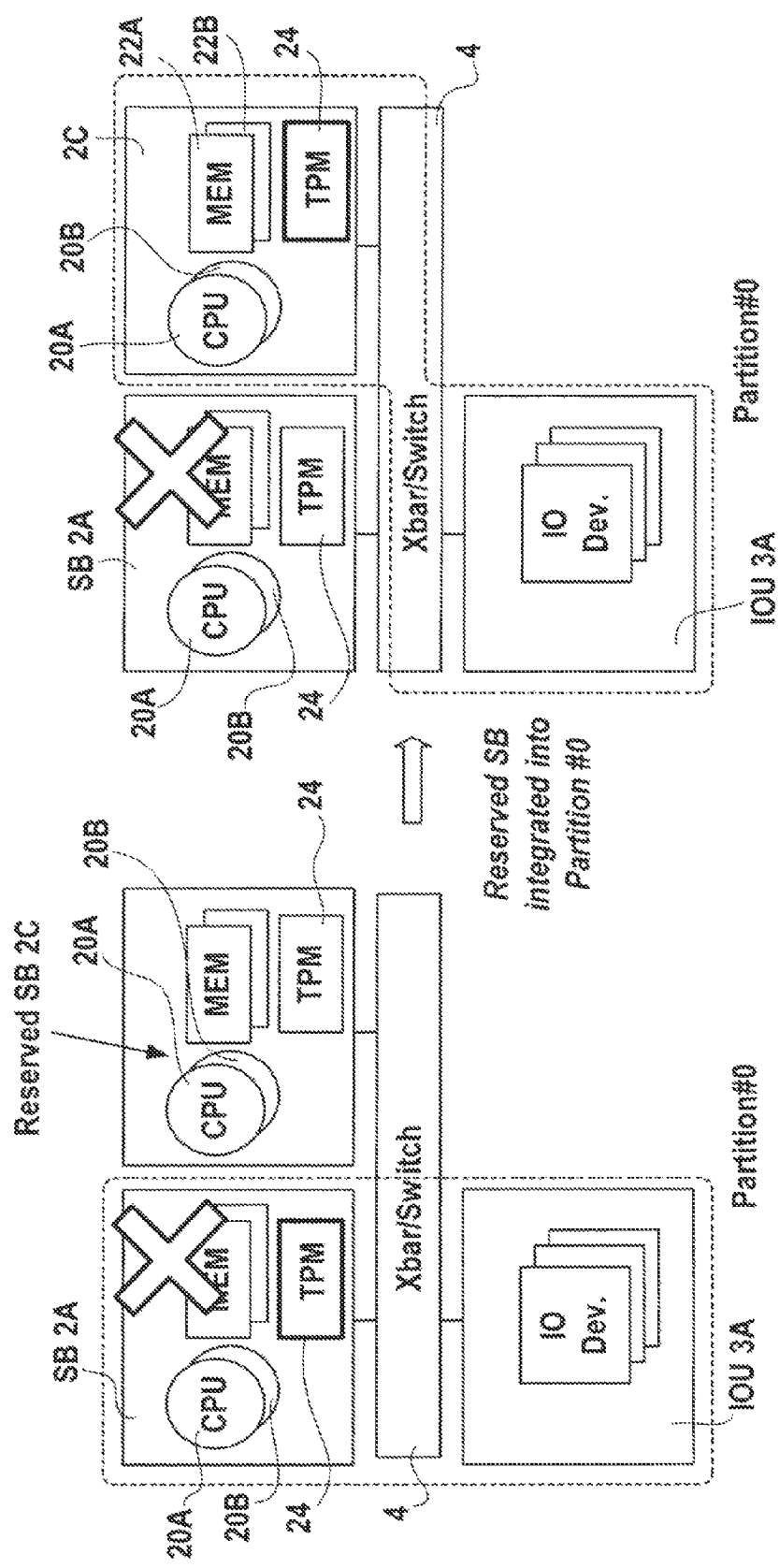
FIG. 4 is an explanatory diagram of an operation of a reserved replacement in the embodiment depicted in FIG. 2 when the TPM is mounted.

Next, FIG. 2 illustrates an explanatory diagram of a configuration embodiment of partitions in the information processing device depicted in FIG. 1. FIG. 3 illustrates an explanatory diagram of an operation of a reserved replacement in the embodiment depicted in FIG. 2. FIG. 4 illustrates an explanatory diagram of an operation of a reserved replacement in the embodiment depicted in FIG. 2 when the TPM is mounted.

In the embodiment illustrated in FIG. 2 and FIG. 3, the TPM 24 is omitted in order to simplify an explanation. The partition will be explained according to FIG. 2. As illustrated by FIG. 2, The system has a structure of connecting the system board 2A to 2D which mount the CPUs 20A, 20B and memories 22A, 22B with the IOU 3A to 3N which mount the IO device via the crossbar switch (or the switch) 4.

In the structure, it is possible to set the partition as illustrated in right side of FIG. 2. That is, FIG. 2 illustrates to create three partitions (#0, #1, #2) by the partition function. The partition #0 is constructed of the system boards 2A, 2B and the IOU 3A, the partition #1 is constructed of the system board 2C and the IOUs 3B, 3C, and the partition #2 is constructed of the system board 2D and the IOU 3N. Each partition #0, #1, #2 executes an information processing with a logically isolation from the other partition each other.

The function of the reserved system board will be explained according to FIG. 3. The reserved system board function is to reserve the other system board in advance against a failure of one system board which is operating, and to automatically incorporate the reserved system board in behalf of a failure system board without a manually operation such as a CE (Customer Engineer), when one system board which is operation is failed.

In FIG. 3, it is set that the system board 2C is set as the reserved system board in the MMB 5 against the partition #0 which is constructed of the system boards 2A, 2B and the IOU 3A, for example. And, FIG. 3 illustrates an example that single the system board 2B is failed during operation in the partition #0.

When the system board 2B occurred failure, the MMB 5 detects the failure and automatically incorporates (or integrates) the system board 2C which is indicated as the reserved SB in advance into the partition #0. And the MMB 5 separates the failed system board 2B from the partition #0 and restarts the partition #0.

As illustrated by FIG. 4, it is difficult to effectively utilize the reserved SB function, when the TPM 24 is mounted on the system board. The TPM 24 is a security chip as an encryption processing device which has an encryption processing function, store function of an encrypt key and a construction certify function of a platform. This TPM 24 can be used to detect a falsification by encrypting the data (storage data), authentication of the device and a construction certify of the platform.

Because the system board 2A has a construction that the CPU and memory are connected by chipset (bridge circuit), the TPM 24 is connected under the chipset via a bus, when the TPM 24 is mounted on the system board. Because the specification of the TPM 24 permits that only one circuit chip (the second bridge circuit 28 referred in FIG. 1) which connects an upper side of the TPM is valid in the system (partition), it is required for a user to manually or automatically designate the system board which uses the TPM 24 when setting the partition. This system board is called as a home system board (Home SB).

In FIG. 4, the system board 2A is set as the home system board (Home SB) and the system board 2C is set as the reserved system board, for example. When the home system board (Home SB) 2A occurred failure (as indicated a mark with a cross in FIG. 4) in the partition #0, the TPM chip 24 itself replaces if the reserved system board 2C is integrated into the partition #0 by using the reserved SB function.

The TPM 24 uses same encrypt generation formula for each chip, but generates a different encryption according to a setting initial value for each chip. Therefore, when the reserved system board 2C is integrated in behalf of the system board 2A, the TPM 24 calculates a peculiar value for the construction certify from the initial value at the restart time of the OS after booting by the BIOS. However, since this calculated peculiar value is different from an expected value of the OS, the function of the construct certify occurs an error. Therefore, the system board 2C does not restart after integrating the reserved system board 2C. That is, the result is that the reserved SB function, which automatically integrates the reserved system board in behalf of a failure system board without a manually operation such as a CE (Customer Engineer), cannot be effectively utilize.

Figure 5:
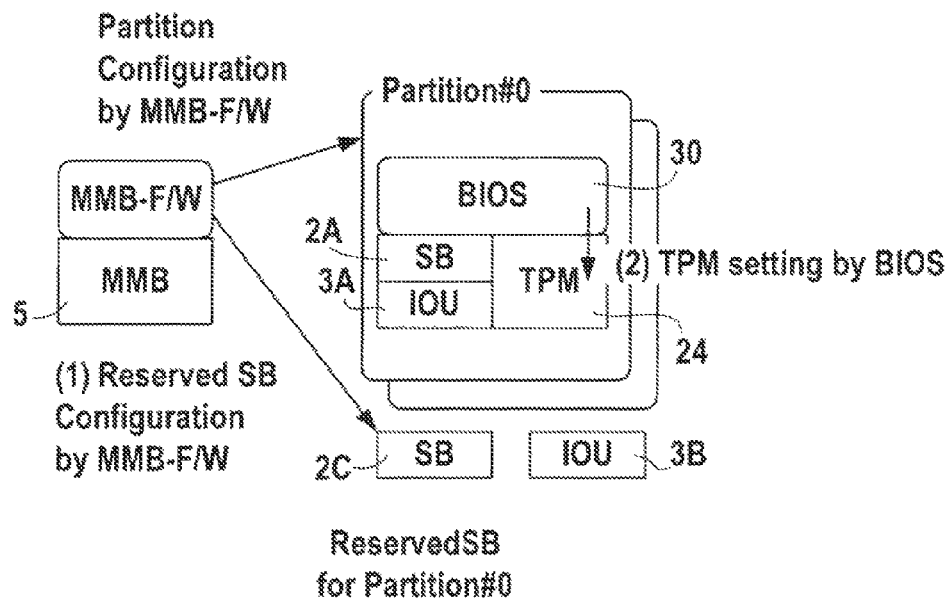
FIG. 5 is an explanatory diagram of settings of the reserved SB and the TPM.
Figure 6:
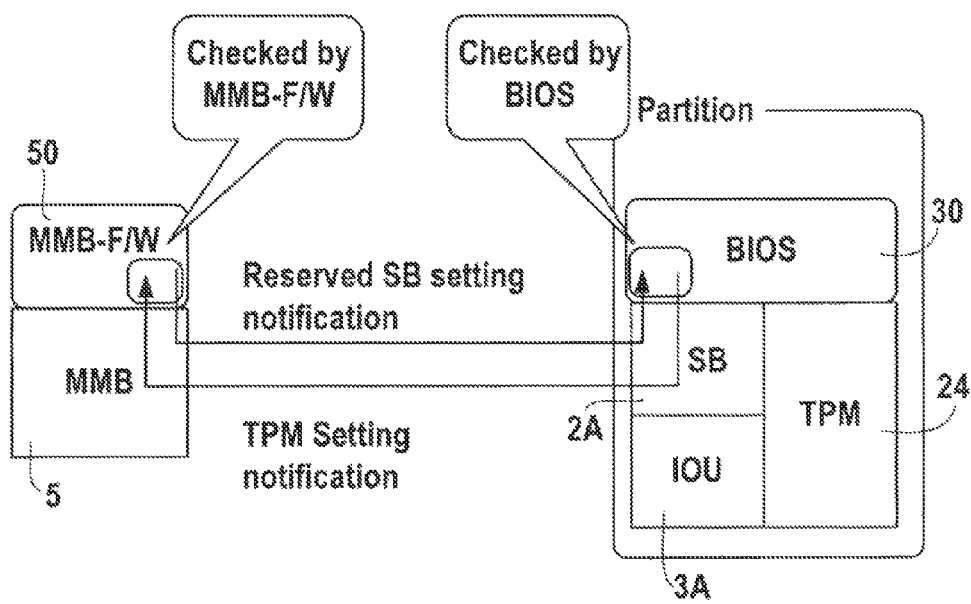
FIG. 6 is an explanatory diagram of an exclusive control between the settings of the reserved SB and the TPM in the embodiment.

FIG. 5 illustrates an explanatory diagram of settings of the reserved SB and the TPM. FIG. 6 illustrates an explanatory diagram of an exclusive control between the settings of the reserved SB and the TPM in the embodiment.

As illustrated by FIG. 5, the MMB 5 (as referring to FIG. 1) has a independent service processor and executes a MMB firmware program 50 on the management unit which is always operated by a supply power. The MMB firmware program 50 executes a construction of the partition and a setting of the reserved SB. That is, the MMB firmware program 50 sets the reserved system board 2c to the reserved SB according to a designation from the PC 9 (as referring to FIG. 1) and store the set information as internal information (as illustrated by (1) in FIG. 5).

While, the TPM 24 is set by the BIOS 30 which starts on the partition constructed by the MMB 5 (as illustrated by (2) in FIG. 5). The BIOS 30 is a firmware program which starts on the partition and executes an initialization and a setting of the hardware on the partition. The hardware includes the TPM 24. The BIOS 30 executes an initialization and a setting (valid or invalid) of the TPM 24.

There is no exchange of the information between the setting of the reserved SB by the MMB 5 and the setting of the TPM 24 by the BIOS 30. Therefore, as illustrated by FIG. 6, a logical path is provided to notify the setting information of the TPM 24 from the BIOS 30 to the MMB 5 (the MMB firmware 50) and to notify the setting information of the reserved SB from the MMB firmware 50 of the MMB 5 to the BIOS 30.

Based on the notifications, setting process of the MMB firmware 50 of the MMB 5 to the BIOS 30 executes an exclusive control of setting for each function. For example, when the TPM 24 is valid, it is excluded to set the reserved SB. When the reserved SB has set, it is set that the TPM 24 is invalid.

By this construction, it is realized to perform a restart operation of the reserved SB function without an occurrence of an error even though the system board mounted the TPM.

A First Embodiment of a Hardware Setting Process

Figure 7:
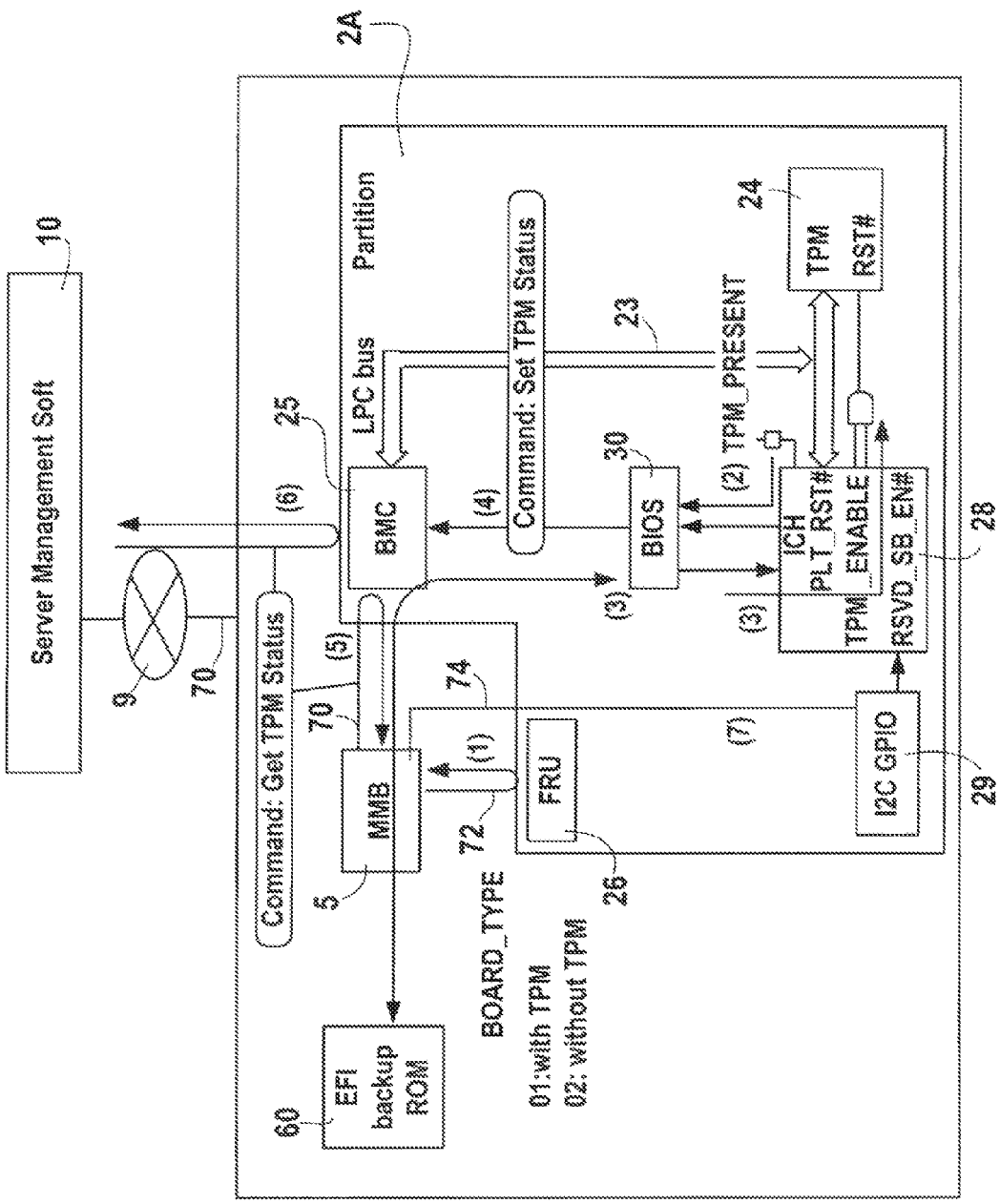
FIG. 7 is a configuration diagram of the system board and the MMB in the configuration of FIG. 1 and FIG. 4.
Figure 8:
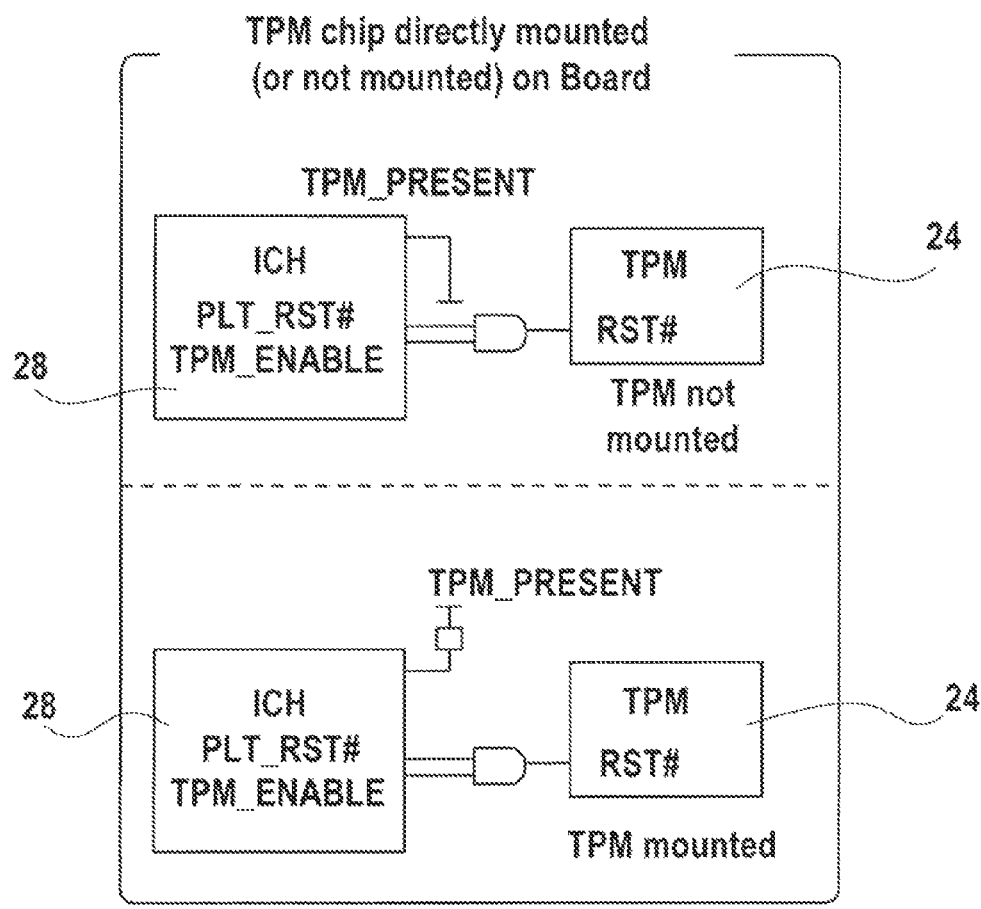
FIG. 8 is an explanatory diagram of an operation that BIOS detects whether or not the TPM is mounted.
Figure 9:
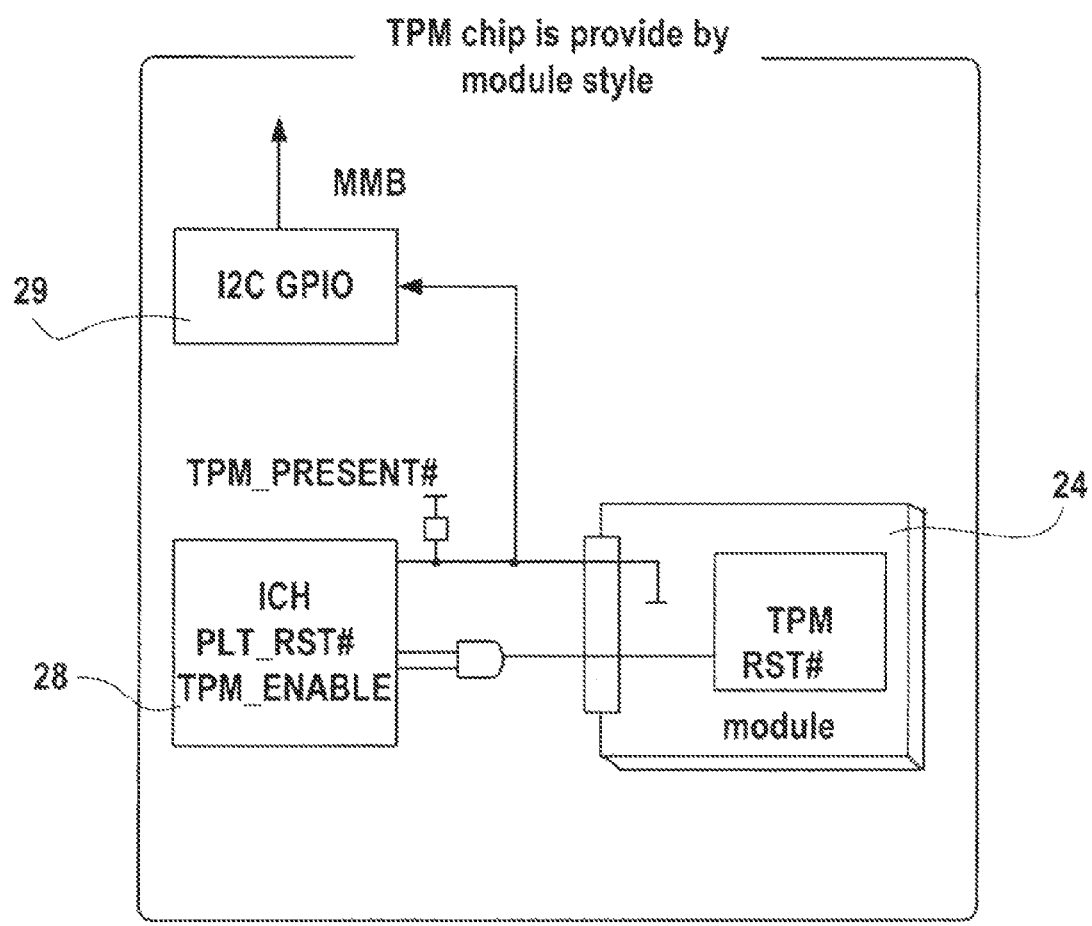
FIG. 9 is an explanatory diagram of an operation that MMB detects whether or not the TPM is mounted.
Figure 12:
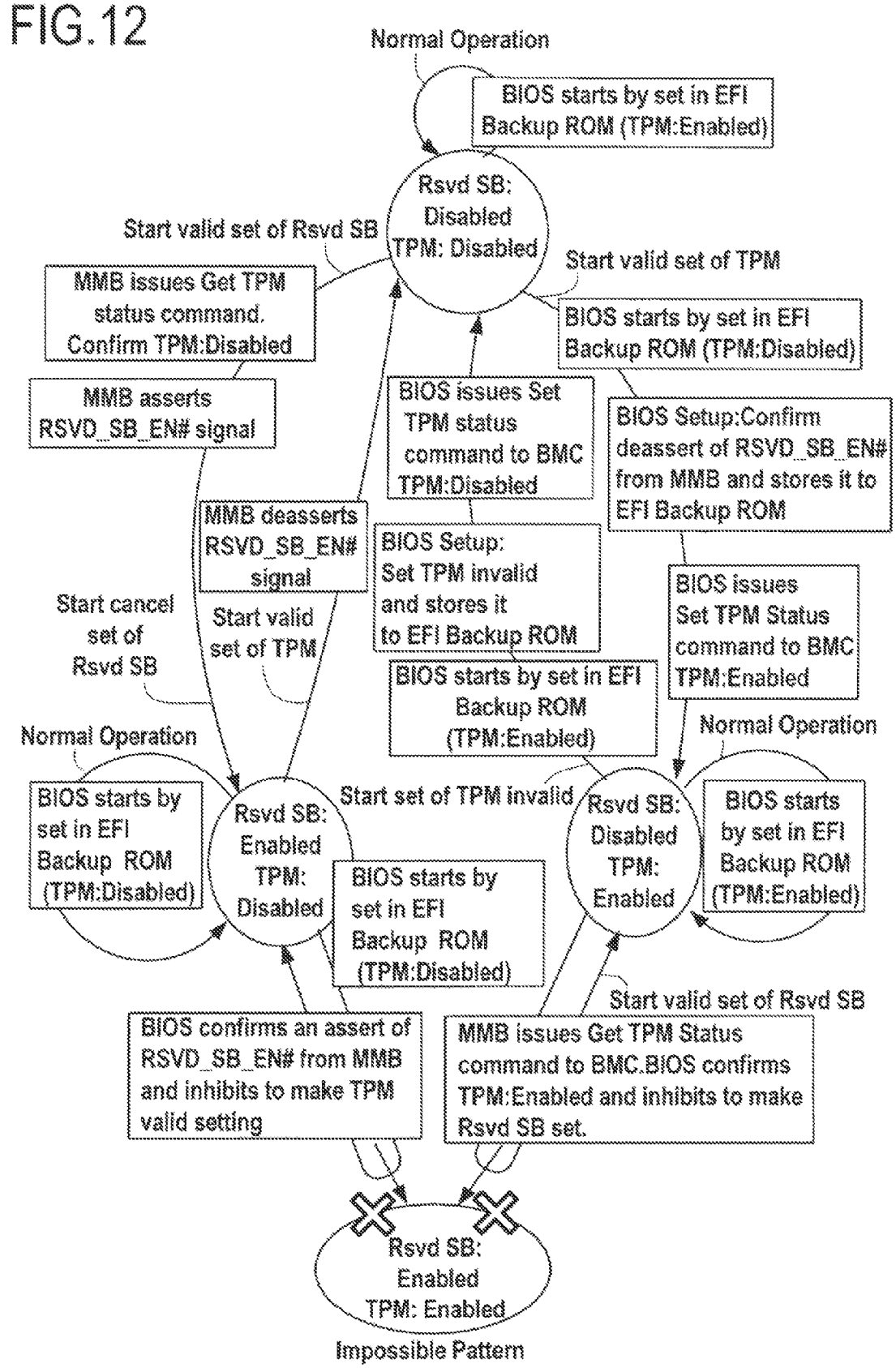
FIG. 12 is an explanatory diagram of the exclusive control operation in FIG. 10 and FIG. 11.

FIG. 7 is a configuration diagram of the system board 2A and the MMB 5 in the configuration of FIG. 1 and FIG. 4. In FIG. 7, same elements illustrated by FIG. 1, FIG. 4 and FIG. 6 are indicated by same symbol. FIG. 8 is an explanatory diagram of an operation that BIOS detects whether or not the TPM is mounted. FIG. 9 is an explanatory diagram of an operation that MMB detects whether or not the TPM is mounted. FIG. 10 is an explanatory diagram of the exclusive processing when the MMB sets that the reserved SB is set in advance in a first embodiment. FIG. 11 is an explanatory diagram of the exclusive processing when the BIOS sets that the TPM is valid in advance in the first embodiment. FIG. 12 is an explanatory diagram of the exclusive control operation in FIG. 10 and FIG. 11.

As illustrated by FIG. 7, the MMB 5 connects to the BMC 25 in the system board 2A via the internal interface 70 such as I2C in FIG. 1 and executes a processing of the setting in the system board in cooperation with the BMC 25. The FRU 26 in the system board 2A stores system information such as a construction information in the system board in advance. The FRU 26 stores an information whether the TPM 24 is mounted on the system board 2A (01: with TPM) or not (02: without TPM) as a part of the stored information. The FRU 26 connects to the MMB 5 via the internal path (bus) 72.

In the system board 2A, the BMC 25 connects to the second bridge circuit (illustrated by ICH in FIG. 7) 28 via a LPC (Low Pin Count) bus 23. And the TPM 24 connects to the second bridge circuit (illustrated by ICH in FIG. 7) 28 via the LPC (Low Pin Count) bus 23.

The process will be explained by using FIG. 7 while referring FIG. 8 and FIG. 9.

When the system board 2A is mounted on the enclosure of the server system 1, the MMB 5 reads the FRU 26 in the system board 2A and confirms the construction information. In this confirmation process, the MMB 5 checks whether or not the TPM 24 is mounted (as illustrated by (1) in FIG. 7). By this confirmation, the MMB 5 immediately confirms whether or not the TPM 24 is mounted even though the situation that the system board 2A is not integrated in the partition.

Next, when the system board 2A is integrated in the partition by the MMB firmware 50 of the MMB 5, the BIOS 30 of the system board 2A is started. When the BIOS 30 is started, it is possible to control that the TPM 24 is valid or invalid by the setting of the BIOS 30. The invalid means that the OS cannot recognize the hardware of the TPM.

The BIOS 30 detects a signal called as TPM_PRESENT, which connects to an general purpose input output circuit (GPIO) in the second bridge circuit 28 and confirms whether or not the TPM chip 24 is mounted on (as illustrated by (2) in FIG. 7). As illustrated in FIG. 8, the TPM_PRESENT signal becomes a low level when the TPM chip 24 is not mounted (or connected) (as illustrated an upper side of FIG. 8). And the TPM_PRESENT signal becomes a high level when the TPM chip 24 is mounted (or connected) (as illustrated a lower side of FIG. 8). The BIOS 30 confirms whether or not the TPM chip 24 is mounted by detecting a voltage level of the TPM_PRESENT signal.

Further, FIG. 9 is an example which the TPM 24 is mounted with a module form. In FIG. 9, the second bridge circuit 28 notifies a discrimination signal (TPM_PRESENT), which indicates whether or not the TPM is mounted, to the TPM module 24. By this notification, the BIOS 30 confirms whether or not the TPM is mounted via the GPIO 29. Because it is difficult that the FRU 26 recognizes whether or not the TPM is mounted in this case, the MMB 5 is notified whether or not the TPM is mounted via the GPIO 29 to FRU 26. By this construction, it is realized that the FRU 26 performs a function of recognition whether or not the TPM is mounted.

The BIOS 30 reads the setting of valid or invalid of the TPM 24 from the EFI 60 via the MMB 5 (as illustrated by (3) in FIG. 7). The setting of valid or invalid of the TPM 24 is executed by a screen of the PC 8 and the setting details are stored in the TPM set memory area 60A in the EFI 60. The BIOS 30 independently controls a reset of the TPM 24 to control that the TPM is valid or invalid.

For example, when setting that the TPM 24 is invalid, the BIOS 30 makes the GPIO (TPM_ENABLE) pin to de-assert 'LOW' and maintains the reset status of the TPM chip 24 (as illustrated by (3) in FIG. 7).

The BIOS 30 reports a present setting status of the TPM 24 by a command after controlling the valid or invalid (as illustrated by (4) in FIG. 7). The BMC 25 stores the setting information of the TPM 24 in an internal portion.

Then the MMB 5 obtains the setting information of the TPM by a command in a necessary case such as setting the reserved SB (as illustrated by (5) in FIG. 7). A server management software on a server, which connects to the internal interface 70 such as I2C, may obtain the setting information of the TPM by the command (as illustrated by (6) in FIG. 7).

Because the MMB 5 holds the setting information of the TPM 24, the MMB 5 confirms the setting information of the TPM 24 even though the partition does not enter a power, that is, the BIOS is not started. It is possible to save a process to shift to the setting screen of the BIOS circumstance only for a confirmation of the setting information of the TPM 24 by referring the setting information of the TPM 24 from the MMB 5 on maintenance. Because it is inhibited to operate the setting screen of the BIOS during a start of the system, that is, a start of the OS, it is a large advantage to confirm it in advance.

After the MMB 5 set the reserved SB for each partition, the MMB 5 operates to assert a signal (signal name: RSVD_SB_EN#) for the GPIO of the second bridge circuit 28 via the GPIO 29 of the system board 2A which functions as the home SB of the partition. Thereby, the MMB 5 notifies it to the system board 2A (as illustrated by (7) in FIG. 7). The BIOS recognizes that the reserved SB is set for the partition by accessing the GPIO.

In this way, it is possible that both the MMB 5 and the BIOS 30 recognizes the setting of the reserved SB and status whether the TPM is mounted or not each other. Thereby, it is possible to exclusive control as regard to the setting the reserved SB as explain in below.

FIG. 10 is an explanatory diagram of the exclusive control processing when the MMB sets the reserved SB in advance of the BIOS 30. The processing in FIG. 10 will be explained with a transition diagram in FIG. 12.

The MMB 5 sets the reserved SB to the system board 2A by operating to assert a signal (signal name: RSVD_SB_EN#) for the GPIO of the second bridge circuit 28 via the GPIO 29 of the system board 2A which functions as the home SB of the partition (as illustrated by process 1 in FIG. 10).

When the MMB 5 instructs a start of the partition, the BIOS of the system board 2A is started (as illustrated by process 2 in FIG. 10).

In case of not entering the BIOS setup menu, the BIOS 30 reads the information of the TPM setting memory area 60A from EFI 60. In this case, an invalid as the setting of the TPM is certainly stored in EFI 60. Because, if the BIOS 30 previously set the valid of the TPM, it is restrained to set the reserved SB by the EFI 60 by notifying the setting information from the BIOS 30 to the MMB 5. Therefore, the BIOS 30 sets the invalid of the TPM 24 (as illustrated by process 3 in FIG. 10).

In case of entering the BIOS setup menu and setting that the TPM 24 is valid, because the BIOS 30 checks that the RSVD_SB_EN# signal is asserted, the BIOS 30 outputs an alarm even though changing that the setting of the TPM 24 is valid. Therefore, it is prevented to change that the function of the TPM is valid (as illustrated by process 3 in FIG. 10).

FIG. 11 is an explanatory diagram of the exclusive control processing when the BIOS sets that the TPM chip is valid in advance of the MMB. The processing in FIG. 11 will be explained with a transition diagram in FIG. 12.

Because the MMB 5 is not set the reserved SB, the RSVD_SB_EN# signal is de-asserted. When the MMB 5 instructs a start of the partition, the BIOS of the system board 2A is started (as illustrated by process 1 in FIG. 11).

In case of not entering the BIOS setup menu, the BIOS 30 reads the information of the TPM setting memory area 60A from EFI 60 via the BMC 25 and the MMB 5. In this case, a valid as the setting of the TPM is stored in the EFI 60. Therefore the BIOS 30 asserts the TPM_ENABLE signal (referring to (3) in FIG. 7) to set that the TPM 24 is valid. After the BIOS 30 set the valid, the BIOS 30 sends a TPM state signal to the BMC 25 (as illustrated by process 2 in FIG. 11).

In case of entering the BIOS setup menu and setting that the TPM 24 is valid, the BIOS 30 checks that the RSVD_SB_EN# signal is de-asserted. Because the RSVD_SB_EN# signal is de-asserted, the BIOS 30 set that the TPM 24 is valid as same as above the process 2. After the BIOS 30 set the valid, the BIOS 30 sends a TPM state signal to the BMC 25 and stores the setting information (as illustrated by process 2 in FIG. 11).

The BMC 25 holds the TPM state signal which is a state signal whether the TPM is valid or invalid and is sent from the BIOS 30 (as illustrated by process 3 in FIG. 11). The MMB 5 recognizes that the BIOS 30 set that the TPM is valid in the partition by receiving the TPM state signal from the BMC 25 (as illustrated by process 4 in FIG. 11).

The MMB 5 prevents to set the reserved SB when the PC 8 sets the reserved SB in the partition (as illustrated by process 5 in FIG. 11).

A Second Embodiment of the Hardware Setting Process

Figure 13:
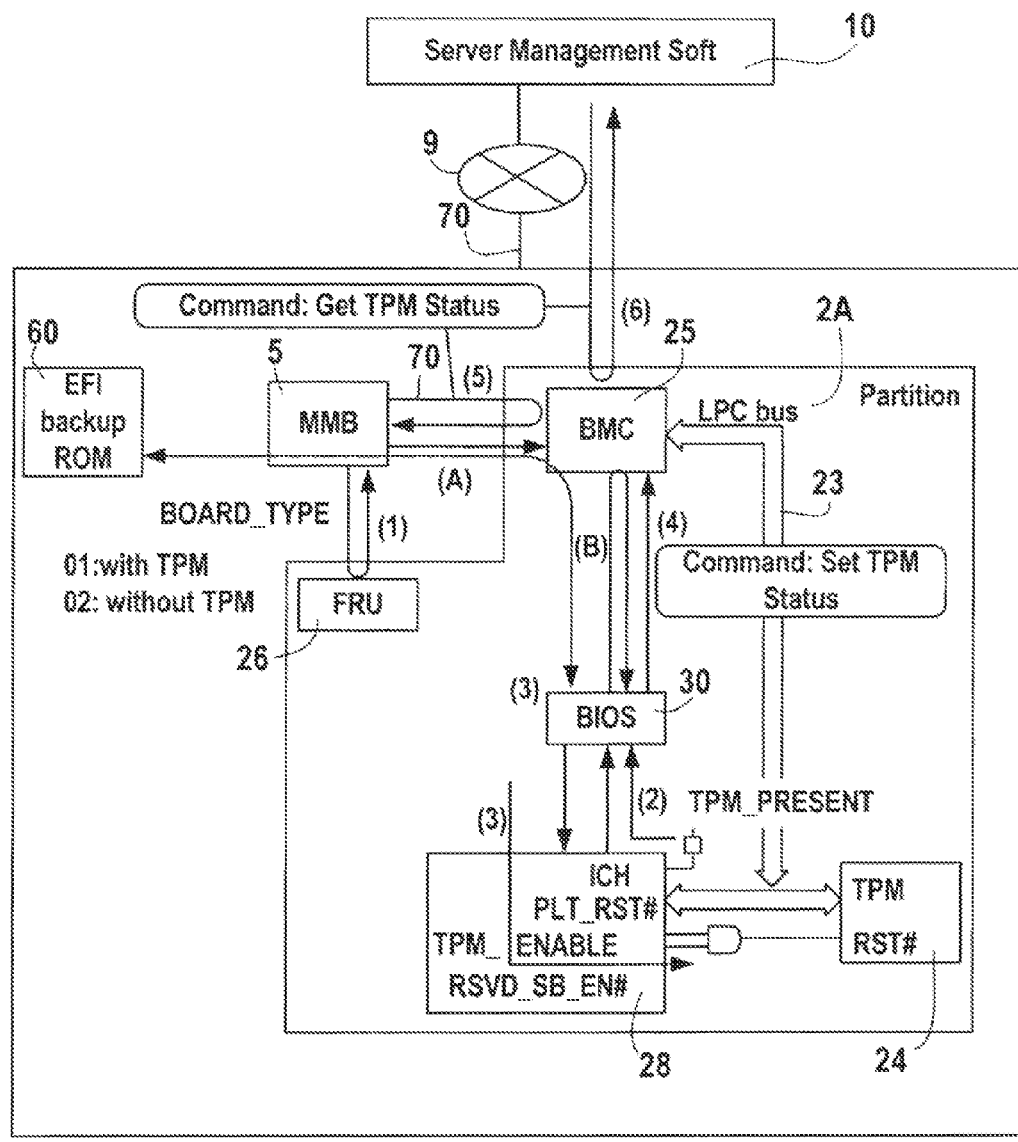
FIG. 13 is a configuration diagram of the system board and the MMB in the configuration of FIG. 1 and FIG. 4 in a second embodiment.
Figure 16:
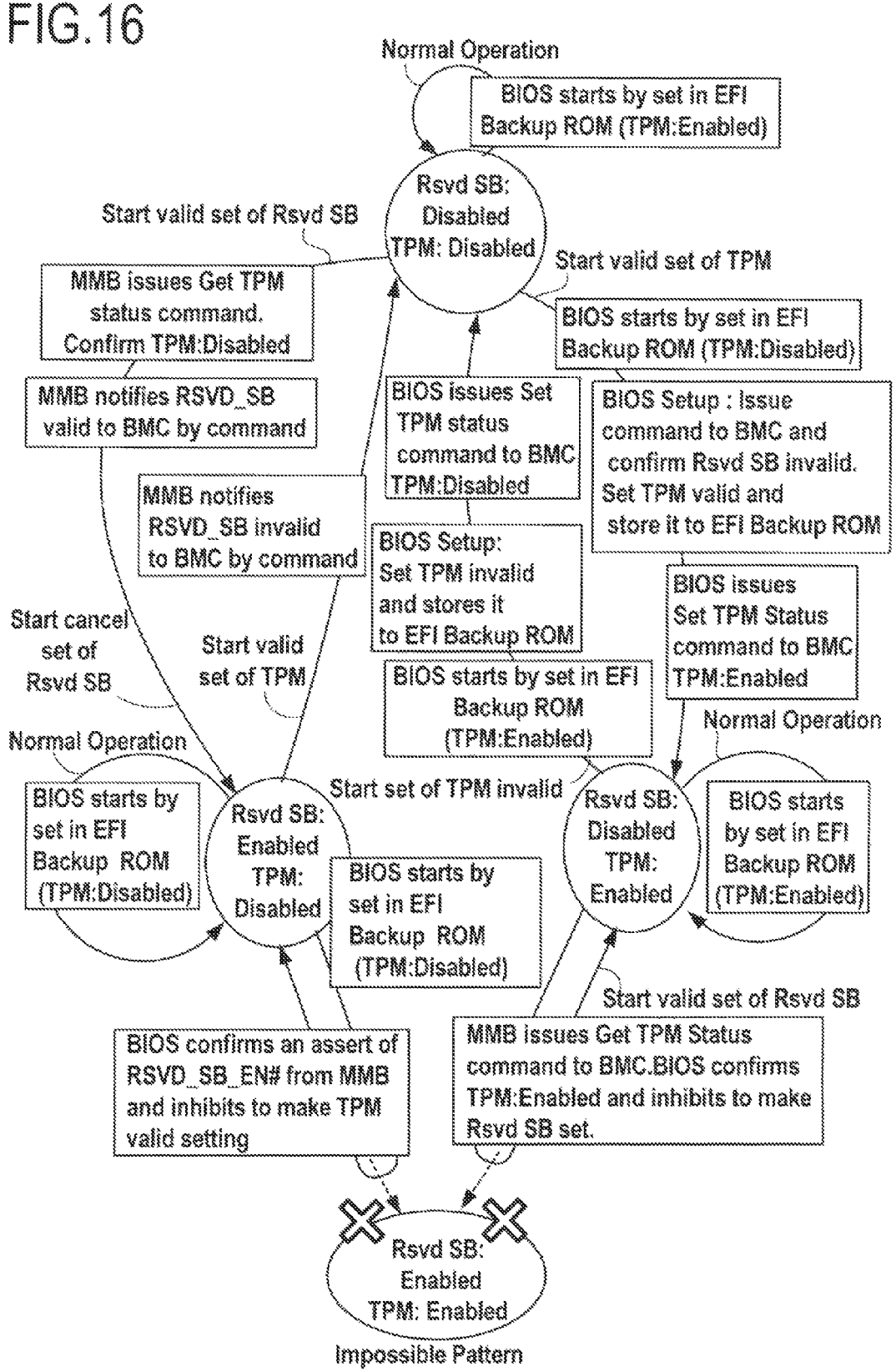
FIG. 16 is an explanatory diagram of the exclusive control operation in FIG. 14 and FIG. 15.

FIG. 13 is a configuration diagram of the system board 2A and the MMB 55 in the configuration of FIG. 1 and FIG. 4 in a second embodiment. In FIG. 13, same elements illustrated by FIG. 1, FIG. 4, FIG. 6 and FIG. 7 are indicated by same symbol. FIG. 14 is an explanatory diagram of the exclusive processing when the MMB sets that the reserved SB is set in advance in the second embodiment. FIG. 15 is an explanatory diagram of the exclusive processing when the BIOS sets that the TPM is valid in advance in the second embodiment. FIG. 16 is an explanatory diagram of the exclusive control operation in FIG. 14 and FIG. 15.

The second embodiment is an example that the notification path between the MMB 5 and the BMC 25 is common and the GPIO 29 is eliminated in comparative with the example in first embodiment. As illustrated by FIG. 13, in this embodiment, the notification of the reserved SB from the MMB 5 to the BIOS 30 (as illustrated by (7) of information transmission and setting of TPM between the MMB and the BIOS in FIG. 7) is used same interface as the notification of the TPM setting information from the BIOS 30 to the MMB 5 (as illustrated by (4), (5) of information transmission and setting of TPM between the MMB and the BIOS in FIG. 7)

In order to achieve this function, the notification path from the MMB 5 to the BIOS 30 is common and commands A and B are provided. The GPIO 29 is eliminated from the construction in the first embodiment of FIG. 7 and it is possible to save the hardware comparative with the first embodiment.

FIG. 14 is an explanatory diagram of the exclusive control processing when the MMB sets the reserved SB in advance of the BIOS 30. The processing in FIG. 14 will be explained with a transition diagram in FIG. 16.

The MMB 5 notify that the reserved SB is set to the BMC 25 by using the command A (as illustrated by process 1 in FIG. 14). The BMC 25 holds the setting information of the reserved SB notified from the MMB 5 (as illustrated by process 2 in FIG. 14).

When the MMB 5 instructs a start of the partition, the BIOS of the system board 2A is started (as illustrated by process 3 in FIG. 14).

In case of not entering the BIOS setup menu, the BIOS 30 reads the information of the TPM setting memory area 60A from EFI 60 via the BMC 25 and the MMB 5. In this case, an invalid as the setting of the TPM is certainly stored in EFI 60. Because, if the BIOS 30 previously set the valid of the TPM, it is restrained to set the reserved SB by the EFI 60 by notifying the setting information from the BIOS 30 to the MMB 5. Therefore, the BIOS 30 sets the invalid of the TPM 24 (as illustrated by process 4 in FIG. 14).

In case of entering the BIOS setup menu and setting that the TPM 24 is valid, the BIOS 30 sends the command B to the BMC 25 and obtains the setting status of the reserved SB from the BMC 25. When the reserved SB is set, the BIOS 30 outputs an alarm. Therefore, it is prevented to change that the function of the TPM is valid (as illustrated by process 4 in FIG. 14).

FIG. 15 is an explanatory diagram of the exclusive control processing when the BIOS sets that the TPM chip is valid in advance of the MMB. The processing in FIG. 15 will be explained with a transition diagram in FIG. 16.

Because the MMB 5 is not set the reserved SB, the MMB 5 notifies that the reserved SB is not set by using the command A. Or, the MMB 5 does not send the command A. When the MMB 5 instructs a start of the partition, the BIOS of the system board 2A is started (as illustrated by process 1 in FIG. 15).

The BMC 25 holds the setting information of the reserved SB notified from the MMB 5. When the MMB 5 does not notify it to the BMC 25, a setting default of the reserved in the BMC 25 is no setting of the reserved SB, that is, no SB are not set the reserved SB (as illustrated by process 2 in FIG. 15).

In case of not entering the BIOS setup menu, the BIOS 30 reads the information of the TPM setting memory area 60A from EFI 60 via the BMC 25 and the MMB 5. In this case, a valid as the setting of the TPM is stored in the EFI 60. Therefore the BIOS 30 asserts the TPM_ENABLE signal (referring to (3) in FIG. 7) to set that the TPM 24 is valid. After the BIOS 30 set the valid, the BIOS 30 sends a TPM state signal to the BMC 25 (as illustrated by process 3 in FIG. 15).

In case of entering the BIOS setup menu and setting that the TPM 24 is valid, the BIOS 30 sends the command B to the BMC 25 and obtains the setting information of the reserved SB. In this case, because the reserved SB is not set, it is possible to set that the TPM 24 is valid. After the BIOS 30 set the valid, the BIOS 30 sends a TPM state signal to the BMC 25 and stores the setting information in a backup memory which is not illustrated in FIG. 13 (as illustrated by process 3 in FIG. 15).

The BMC 25 holds the TPM state signal which is a state signal whether the TPM is valid or invalid and is sent from the BIOS 30 (as illustrated by process 4 in FIG. 15). The MMB 5 recognizes that the BIOS 30 set that the TPM is valid in the partition by receiving the TPM state signal from the BMC 25 (as illustrated by process 5 in FIG. 15).

The MMB 5 prevents to set the reserved SB when the PC 8 sets the reserved SB in the partition (as illustrated by process 6 in FIG. 15).

That is, in information transmission from the MMB 5 to the BIOS 30, when the MMB 5 set the reserved SB, the MMB 5 sends the command A to the BMC 25 and the BMC 25 holds the setting status of the reserved SB in the partition. Then, when the BIOS 30 is started, the BIOS 30 sends the command B to the BMC 25 and confirms the setting status of the reserved SB.

In the second embodiment, the GPIO 29 is eliminated in comparative with the first embodiment. While, in the first embodiment, because the notification which uses the hard-wire of the GPIO 29 is provided, it is not need to create the commands A and B. Therefore, the first embodiment has an advantage to apply a small device such as a small size server which has not MMB (and the function of the reserved SB). Because the commands A and B for the notification of the reserved SB, which needs in the second embodiment, are not used in the small device which does not need the setting of the reserved SB.

In this way, the setting information of the TPM 24 by the BIOS 30 is notified to the MMB 5, while the setting information of the reserved SB by the MMB firmware 50 is notified to the BIOS 30. It is possible to prevent a setting error by executing an exclusive control which is used the bi-direction information transmission.

And, it is possible to execute the exclusive control both a first case that the MMB 5 sets the reserved SB in advance and a second case that the BIOS 30 sets that the TPM 24 is valid in advance.

Further, the MMB 5 holds the setting of the TPM 24 notified from the BIOS 30 even though the partition-off status which is not set the partition. Therefore, it is not necessary to set the setting information of the BIOS 30 by starting the partition when the changing operation of the system board. It is possible to reduce whole the maintenance time.

The Other Embodiment

In the above embodiments, the examples of dividing two or three partitions were explained, but cases to divide the other number of the partition are applied. And the physical partition was described as an example, but the logical partition also is applied. The example of the system board having a pair of the CPUs and a pair of the memories was explained, but an construction having the other number of the CPUs and the memories is applied. Further, an arbitrary combination to the IOU may be applied.

In this way, since the valid or invalid setting information of the trusted platform module in the system unit and the reserved setting information of the system unit by the management unit are notified each other and are exclusive controlled, it is effectively possible to execute a reserved SB function, which integrates the reserved system board and re-starts without manual operation even though using a system board which mounts the trusted platform module.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprises:
a plurality of processing devices, each of the plurality of processing devices comprising:
a hardware resource that includes an arithmetic processing unit and a memory;
a security unit that performs encrypting processing of data in the hardware resource for securing a security of the hardware resource; and
a system control device that sets at least two processing devices among the plurality of processing device to same partition and reserves the other processing device so as to operate instead of the one processing device of the plurality of processing devices that has occurred a failure in the same partition,
wherein each of the plurality processing devices further comprises an exclusive control unit that exclusively controls a setting for make the security unit to be valid according to a notification of reservation information whether the other processing device was reserved from the system control device, and
wherein the one processing device notifies an information that set the security unit as the valid to the system control device when setting that the security unit is valid before a reservation of the other processing unit and,
the system control device inhibits to set the reservation of the other processing device.

2. The information processing device according to claim 1, wherein the system control device notifies the reserve information indicating that the other processing device is reserved to the one processing device, and
the exclusive control unit of the one processing device inhibits the setting to make the security unit to be valid by referring the reserve information according to a starting a firmware program of the one processing device.

3. The information processing device according to claim 2, wherein the one processing device inhibits to set that the security unit is valid when the reserve information indicates that the other processing device is reserved and permits to set that the security unit is valid when the reserve information indicates that the other processing device is not reserved according to a start of the firmware program.

4. The information processing device according to claim 1, wherein the system control device notifies the reserve information of the other processing device to the one processing device via a signal line.

5. The information processing device according to claim 1, wherein the system control device notifies the reserve information of the other processing device to the one processing device via a notification path that notifies setting information of the hardware resource.

6. The information processing device according to claim 1, wherein the processing device further comprises a second memory that stores whether the processing device includes the security unit,
and the system control device refers the second memory and confirms whether the processing device includes the security unit.

7. The information processing device according to claim 1, wherein the processing device confirms whether the processing device includes the security unit according to a start of the firmware program.

8. The information processing device according to claim 3, wherein the firmware program starts to issue a reset signal setting the security unit to the valid to the security unit when setting that the security unit is valid.

9. A hardware setting method of an information processing device comprising a plurality of processing devices, each of the plurality of processing devices comprising a hardware resource that includes an arithmetic processing unit and a memory, and a security unit that performs encrypting processing of data in the hardware resource for securing a security of the hardware resource, said method comprising:
   setting same partition to at least two the processing device among the plurality of processing device by a system control device which is connected to the plurality of processing devices;
   reserving the other processing device so as to operate instead of one processing device of the plurality of processing devices that has occurred a failure in the same partition by the system control device;
   exclusively controlling a setting for making the security unit valid according to a notification of reservation information whether the other processing device was reserved from the system control device to the one processing unit by the one processing unit;
   notifying an information that set the security unit as the valid to the system control device when the one processing device set that the security unit is valid before a reservation of the other processing unit; and
   inhibiting to set the reservation of the other processing device by the system control device.

10. The hardware setting method of the information processing device according to claim 9, the exclusively controlling further comprising:
    notifying the reserve information indicating that the other processing device is reserved from the system control device to the one processing device; and
    inhibiting the setting to make the security unit to be valid by referring the reserve information according to a starting a firmware program of the one processing device by an exclusive control unit of the one processing device.

11. The hardware setting method of the information processing device according to claim 10, wherein the exclusively controlling comprising:
    inhibiting a set that the security unit is valid when the reserve information indicates that the other processing device is reserved according to a start of the firmware program; and
    permitting to set that the security unit is valid when the reserve information indicates that the other processing device is not reserved according to the start of the firmware program.

12. The hardware setting method of the information processing device according to claim 9, wherein the exclusively controlling comprising notifying the reserve information of the other processing device to the one processing device via a signal line by the system control device.

13. The hardware setting method of the information processing device according to claim 9, wherein the exclusively controlling comprising notifying the reserve information of the other processing device to the one processing device via a notification path that notifies setting information by the system control device.

14. The hardware setting method of the information processing device according to claim 9, wherein said method further comprising:
    reading a second memory, that stores whether the processing device includes the security unit, by the system control device; and
    confirming whether the processing device includes the security unit or not by the system control device.

15. The hardware setting method of the information processing device according to claim 9, wherein said method further comprising confirming whether the processing device includes the security unit according to a start of the firmware program by the processing device.

16. The hardware setting method of the information processing device according to claim 11, wherein said method further comprising starting to issue a reset signal setting the security unit to the valid to the security unit when setting that the security unit is valid by the firmware program.

17. A non-transitory computer readable recording medium stored therein a program for causing a computer to execute a hardware setting process of a plurality of processing devices comprising a hardware resource that includes an arithmetic processing unit and a memory, and a security unit that performs encrypting processing of data in the hardware resource for securing a security of the hardware resource,
    setting same partition to at least two the processing device among the plurality of processing device by a system control device which is connected to the plurality of processing devices;
    reserving the other processing unit so as to operate instead of one processing device of the plurality of processing devices that has occurred a failure in the same partition by the system control device;
    exclusively controlling a setting for making the security unit valid according to a notification of reservation information whether the other processing device was reserved from the system control device to the one processing unit by the one processing unit;
    notifying an information that set the security unit as the valid to the system control device when the one processing device set that the security unit is valid before a reservation of the other processing unit; and
    inhibiting to set the reservation of the other processing device by the system control device.

18. The non-transitory computer readable recording medium stored the program according to claim 17, the program causes to further execute,
    notifying the reserve information indicating that the other processing device is reserved from the system control device to the one processing device; and
    inhibiting the setting to make the security unit to be valid by referring the reserve information according to a starting a firmware program of the one processing device by an exclusive control unit of the one processing device.

* * * * *